United States Patent [19]
Dulaney et al.

[11] 3,934,224
[45] Jan. 20, 1976

[54] APPARATUS FOR CONTINUOUS ASSESSMENT OF DATA TRANSMISSION ACCURACY IN A COMMUNICATION SYSTEM

[75] Inventors: Ernest N. Dulaney, Clearwater; Richard F. Elmhurst, Largo, both of Fla.

[73] Assignee: Honeywell Information Systems, Inc., Waltham, Mass.

[22] Filed: Oct. 29, 1974

[21] Appl. No.: 518,538

[52] U.S. Cl............... 340/146.1 BA; 340/146.1 AX
[51] Int. Cl.²................... G06F 11/00; G08C 25/02
[58] Field of Search ......... 340/146.1 BA, 146.1 BE, 340/146.1 AX, 146.1 D; 325/56; 178/69.5 R

[56] References Cited
UNITED STATES PATENTS

| | | | |
|---|---|---|---|
| 3,315,228 | 4/1967 | Futerfas et al. | 340/146.1 E |
| 3,453,592 | 7/1969 | Ishii et al. | 340/146.1 D |
| 3,471,830 | 10/1969 | McRae et al. | 340/146.1 D |
| 3,596,245 | 7/1971 | Finnie et al. | 340/146.1 D |
| 3,646,518 | 2/1972 | Weinstein | 340/146.1 BA |
| 3,725,860 | 4/1973 | Kemper et al. | 340/146.1 E |
| 3,790,769 | 2/1974 | Ziegler | 340/146.1 A X |
| 3,828,130 | 8/1974 | Yamaguchi | 340/146.1 D |
| 3,829,777 | 8/1974 | Muratani et al. | 325/56 |

*Primary Examiner*—Charles E. Atkinson
*Attorney, Agent, or Firm*—Nicholas Prasinos; Ronald T. Reiling

[57] ABSTRACT

A method and apparatus are disclosed for monitoring the accuracy of electronic data transmitted over a communication channel or telemetry link. Data is monitored at the transmitting point and also at the receiving point. Data monitored at the receiving point is transmitted to the data transmitting station and then compared with the data monitored at the transmitting point. Means are provided to synchronize the data monitored at two points, so that comparison is conducted over the same monitored data. After synchronization the bit error rate (BER) is calculated based on the number of miscompares that result for a given quantity of data transmitted. When the system exceeds a predetermined level corrective action is taken.

15 Claims, 4 Drawing Figures

FIG. 1

APPARATUS FOR CONTINUOUS ASSESSMENT OF DATA TRANSMISSION ACCURACY IN A COMMUNICATION SYSTEM

BACKGROUND OF THE INVENTION

1. Field of the Invention

This invention relates generally to data transmission systems and more particularly to monitoring the accuracy of data transmitted over wireless or cable communication systems.

2. Description of Prior Art

As the uses of computers proliferates there is a growing need for remote terminals to communicate with computers and with computers to communicate with each other. In the checkless society envisioned for the future, for example, there will be a network of bank computers communicating with each other and with computers in the retail and industrial sector such that a transaction in a retail establishment thousands of miles from the customer's bank is immediately recorded via communicating computers. The account of the retail establishment is credited whereas the account of the customer is debited. Similarly a customer's credit may be instantaneously checked. Other uses of data communication too numerous to mention are not only envisioned but in some instances are presently operational.

In such a network of computers it can readily be appreciated that accuracy of the data transmitted is of utmost importance. Whereas some improvements in transmission of data have been made in order to insure that the data received is the same as the data transmitted, there is also a need to continuously monitor the transmit/receive communication system so that degradations or malfunctions in the system may be detected at an early stage in order to institute timely corrective action.

Typical monitoring means of prior art consists of apparatus which perform communication system assessment on an interfering basis which requires the transmit/receive communication system to be taken out of service. Other prior art apparatus conduct communication performance assessment in a presumptive manner by monitoring circuit parameters such as signal-to-noise ratio, phase distortion, signal level, etc., which are not direct measures of the data communication system performance. Still other prior art monitors performance of the communication system in such a manner which does not enable detection of degradations in the system prior to system malfunction.

What is needed is a means to monitor data communications systems in an in-service, non-interfering manner, which utilizes a direct measure of system performance such as data error rate and which can predict system malfunctions by determining degrading trends of system performance.

OBJECTS OF THE INVENTION

It is a primary object of the invention to provide an improved error monitoring method and apparatus for electronic data transmitted over a communication system.

It is another object of the invention to provide a monitoring apparatus which is a direct measure of the performance of a transmit/receive data communication system.

It is still another object of the invention to provide an in-service error monitoring apparatus which performs bit error rate (BER) computation in a manner which does not interfere with the transmit/receive communication systems.

It is still a further object of the invention to determine the operational status of the transmit/receive communication system and predict the point at which a malfunction will occur to facilitate maintenance and minimize down-time of the transmit/receive communication system.

It is yet another object of the invention to provide an error monitoring apparatus in conjunction with a computer which performs bit error rate (BER) computation in a high speed and versatile manner.

A further object of the invention is to provide a method and apparatus for comparing a unit of information transmitted to the same unit of information received.

Still a further object of the invention is to provide a method and apparatus for synchronizing itself so that the unit of information transmitted is in fact compared to the same unit of information that is actually received.

It is still another object of this invention to provide a means of scanning and selecting one of several transmit/receive communications systems for monitoring.

These and other objects of the invention will become apparent from the description of the embodiments of the invention when read in conjunction with the drawings contained herewith.

SUMMARY OF THE INVENTION

The invention comprises an improved method and apparatus for continuously monitoring the accuracy of electronic data transmitted over a communication system. Data is monitored at the transmitting point and also at the receiving point. A monitored set of data for a predetermined quantity of data received is transmitted back to the original data transmitting station and there compared with a monitored set of data representing a predetermined quantity of data that is transmitted. Means are provided to synchronize the comparison of monitored data so that the two sets of monitored data compared represent the same data. After synchronization the bit error rate (BER) is calculated based on the number of miscompares that result for a given quantity of data transmitted. When the system exceeds a predetermined level corrective action may be taken.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by references to the following description taken in conjunction with the drawings in which:

DETAILED DESCRIPTION OF THE INVENTION

General Discussion

Figure 1:
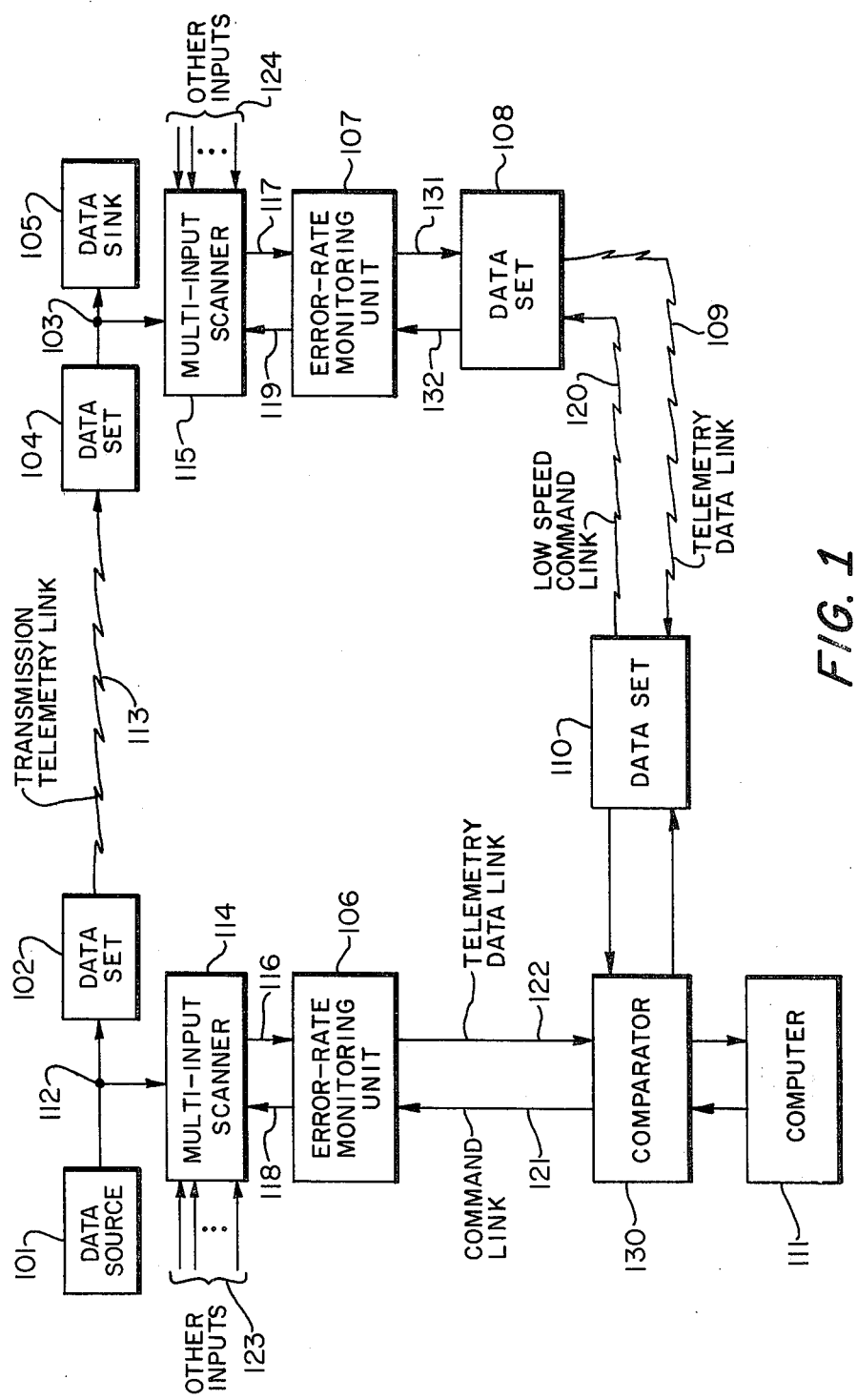
FIG. 1 is a block diagram of a typical transmit/receive system utilizing the invention.

Referring to FIG. 1 there is shown a general data transmitting and receiving system utilizing the invention. Data from some data source 101 such as a computer or teletype machine which is in an electronic form suitable for manipulation is converted to another electronic form in a data set 102 which is suitable for electronic transmission via a telemetry link 113, telephone cables or other electronic signal transmitting means. Generally the electronic form of data suitable for digital electronic data processing is digital or in the form of high or low electronic signals or electronic pulses. Whereas electronic data suitable for transmission is generally in the form of analog electronic signals. The data transmitted in analog form is reconverted in data set 104 to electronic data in digital form where it may be utilized in a data sink 105 such as another computer or teletype machine at a remote station. Because of the electronic noise usually generated from various sources such as the various electronic equipment or atmospheric conditions, signals may be lost in the transmission and when reconverted to electronic data in digital form would not represent the data that was actually transmitted. Hence, there is a major problem requiring monitoring of the accuracy of the transmit/receive communication system to determine whether or not the data that was received was the same as the data that was transmitted. It is desirable therefore to calculate the bit error rate (BER) of the communication system in an in-service continuous manner in order to ascertain that the bit error rate remains below a predetermined level or within acceptable limits. In order to perform this task an error rate monitoring unit 106 monitors the data transmitted at point 112 in a manner to accumulate bits of data transmitted at 112 for later transmission to a comparator 130 via data link 122. The means of accumulating the data is explained in greater detail later. It should be noted that error rate monitoring unit 106 may accumulate a portion of the data transmitted for later retransmission to comparator 130 or it may transmit the entire amount of information transmitted by data source 101 to comparator 130 for later processing. By similar manner, error rate monitoring unit 107 monitors the data received at point 103. The information monitored at point 103 is accumulated and is then appropriately formatted in unit 107 in a manner similar to unit 106 for transmission to comparator 130 via data set 108, telemetry link 109 and data set 110. The functional operation of data sets 108 and 110 is similar to the operation of data sets 102 and 104 as previously described. Note that if a portion of the data which has been transmitted via the transmission telemetry link 113 and which is monitored by error rate monitoring units 106 and 107 is returned to the comparator 130 for later analysis and comparison, it is possible to utilize a low speed telemetry data link (the baud rate of the telemetry data link 109 is less than the baud rate of the transmission telemetry length 113). However, if the entire transmission of information is returned to comparator 130 for analysis, then it would be necessary to use a telemetry data link 109 with a transmission rate which is equal to or greater then the transmission rate of the transmission telemetry link 113. A greater transmission rate would more likely be required due to the fact that it would be necessary to add error detection bits to the transmission which is returned via 109 thus necessitating a higher transmission rate on transmission link 109 compared to transmission data telemetry link 113. Information acquired by error rate monitoring unit 106 and similarly by error rate monitoring unit 107 is returned to comparator 130 to be compared bit by bit. Since it is essential that the two sets of data returned to comparator 130 be compared bit for bit, a means for synchronizing the sets of information monitored by unit 106 and unit 107 is required. It is necessary therefore to incorporate a means within units 106 and 107 to synchronize these two units with one another to assure that they are monitoring the same sets of information at both points 112 and 103. For the case in which the entire set of information monitored at points 112 and 103 is retransmitted to comparator 130, it is not necessary to incorporate a synchronizing means in units 106 and 107 since the entire synchronizing means will be contained in comparator 130 as will be explained later. For the case in which a portion of the data at 112 and a portion of the data at 103 is being monitored, then it is necessary to include a means to assure that units 106 and 107 are synchronized with one another. In addition to a means to synchronize units 106 and 107 as mentioned above, a means is required to synchronize the data received at comparator 130 from unit 106 with the information received at comparator 130 from unit 107. The synchronizing means mentioned here will be described more fully in conjunction with FIGS. 2 and 4. Once synchronization of the transmitted and received-monitored-data is accomplished, the comparator 130 is utilized together with computer 111 to determine the bit error rate (BER). For example, if error-rate monitoring units 106 and 107 each monitor a set of a thousand bits of data at points 112 and 103 respectively and if this information, after having been properly synchronized in units 106 and 107, is transmitted to comparator 130 and synchronized again at comparator 130 and if in the process of comparison it is determined that 10 bits miscompare out of the set of a thousand bits, then comparator 130 will determine that the error rate is 10 bits for each thousand bits transmitted. This is more commonly expressed as an error-rate of one bit in a hundred bits received at point 103 for information transmitted from point 112. Any number of bits may comprise a set of data monitored which is determined by various factors such as the resolution of error rate, the telemetry data link baud rate, the amount of error detection required in the telemetry link and various other factors.

Units 114 and 115 are multi-input scanners which function to select one of several inputs to be monitored. For ease of description it is assumed that points 112 and 103 have been selected by scanners 114 and 115 respectively. However, other input points (123 and 124) pertaining to transmission telemetry links other than 113 can be selected for monitoring. This procedure is normally referred to as "scanned-monitoring" and can be employed effectively when there exists a multiplicity of transmission telemetry links 113 with data monitoring points similar to 112 at one location. In such a case, it would be cost-effective to return to comparator 130 the entire portion of data transmitted via telemetry link 113 by employing a high speed telemetry data link 109. Multi-input scanners 114 and 115 are described in greater detail later.

Figure 2:
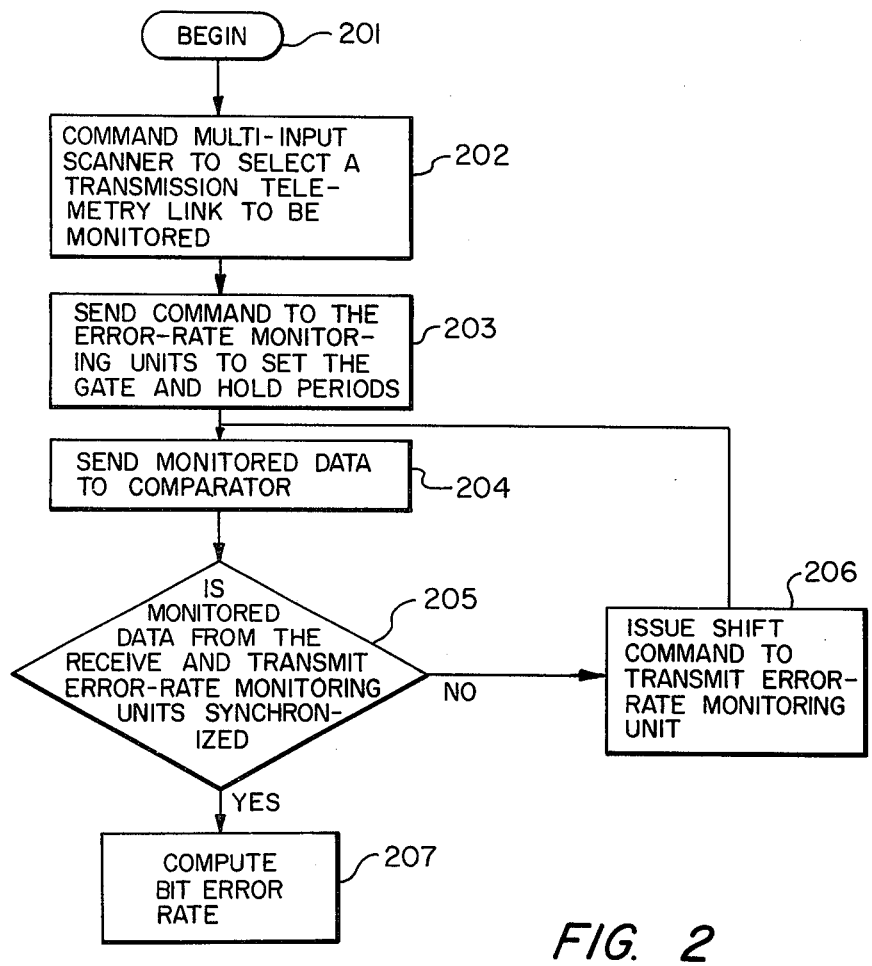
FIG. 2 is a 'broad-brush' flow diagram of the invention.

Referring now to FIG. 2, there is shown in 'broadbrush' flow diagram format the method of accomplishing bit-error-rate computation of data received. The process begins at block 201 with various initialization procedures, common to most data processing systems. The next procedure 202 is to command the multi-input scanners 114 and 115 to select a transmission telemetry link to be monitored. This is accomplished by sending a command message to scanners 114 and 115 from comparator 130 via command links 121 and 120, respectively. This message is received by the scanner and decoded resulting in one of several input lines to be connected to the output lines 116 and 117. The operation of the scanners is described in greater detail in conjunction with FIG. 3. For ease of discussion it will be assumed that points 112 and 103 have been selected for output to lines 116 and 117, respectively. For the case in which a single transmission telemetry link is being monitored, the multi-input scanners will not be required and points 112 and 103 will be connected directly to points 116 and 117, respectively.

The next process 203 is to send a command from comparator 130 and via command links 121 and 120 to error-rate monitoring units 106 and 107 to set the gate and hold periods. This process which establishes the data sampling scheme will be described more fully in conjunction with FIG. 4.

The operation continues with process 204 in which the monitored data is sent to comparator 130 from units 106 and 107 via telemetry data links 122 and 109, respectively. The detailed steps involved with data sampling and transmission will be described more fully in conjunction with FIG. 4.

The next process 205 consists of determining whether or not error-rate monitoring units 106 and 107 are synchronized. This determination is made by comparator 130, in which unit data received from units 106 and 107 (process 204) is compared bit for bit. If data received by comparator is not synchronized then the miscompare count would be inordinately greater than typical bit-error-rates (50 percent miscompare as opposed to a typical bit-error-rate of less than 1 percent). This basis is utilized by comparator 130 to determine if units 106 and 107 are synchronized. Process 205 is described more fully by U.S. Pat. application Ser. No. 458,742, filed Apr. 8, 1974 and assigned to the same assignee as the instant application in which the comparator described therein functions identically to comparator 130. More specifically, the functions and operations of comparator 130 is described in conjunction with FIGS. 3, 4, 5, 6 and 8 of U.S. Pat. application Ser. No. 458,742.

Synchronization of units 106 and 107 results in synchronization of the gate and hold period counters in unit 106 with the gate and hold period counters in unit 107, which results in the same sets of data being monitored by both error-rate monitoring units. An additional process of synchronization is performed by comparator 130 which results in synchronization of the sets of monitored data received from units 106 and 107. This second synchronization process, performed by comparator 130 is described in the above mentioned prior invention application wherein data received at the comparator is referred to as block parity bits. It will be noted by a perusal of FIG. 1 that there is a certain passage of time required in the transmission of the actual data from point 112 to point 103, and there is also a lapse of time required for retransmitting the monitored data error-rate from monitoring unit 107 to comparator 130 via data sets 108 and 110 and telemetry data link 109. Accordingly, if a data bit monitored at point 112 by unit 106 is to be compared in comparator 130 to the same data bit monitored at point 103 by unit 107, then the time delay in transmitting the original data and retransmitting the data via telemetry link 109 must be taken into account in comparator 130 and in error-rate monitors 106 and 107. The time delay accounted for in units 106 and 107 consists of synchronizing the gate and hold counters of units 106 and 107 which in turn results in the same set of data being monitored by both units 106 and 107. This synchronization means is effected by action of comparator 130 issuing a shift command to error-rate monitoring unit 106 (operational flow process 206) after the comparator has determined that synchronization has not been achieved in step 205. In this particular embodiment, the shift command is issued to unit 106, however, the command could likewise be issued to unit 107 with the same synchronizing effect. This command will cause error-rate monitoring unit 106 to monitor data on sets of data at point 112 which have been shifted one data bit relative to the sets of data bits monitored at point 103. After issuance of this command, the process returns to operation 204 and will be repeated until synchronization has been achieved during process 205, confirmed by the fact that the miscompare rate result obtained by comparator 130 is low. Having obtained synchronization, comparator 130 transfers the bit miscompare counts to computer 111, in which bit-error-rate is computed.

The condition, in which the hold period is zero and the gate period is a finite number, is a special condition which will result in a synchronized condition, tested during process 205. It is under this condition that all data bits are monitored and returned to comparator 130 and therefore synchronization of units 106 with 107 (process 206) will not be required. It will be necessary, however, to synchronize the data bits received by comparator 130 as described in the previously referenced U.S. Patent Application.

Figure 3:
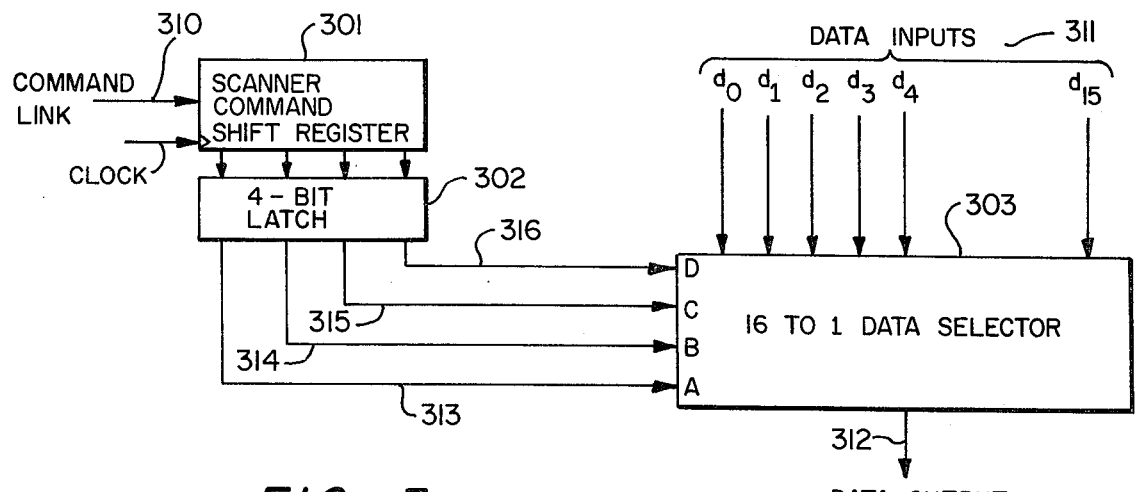
FIG. 3 is a detailed logic block diagram of the multi-input scanner shown in FIG. 1.

Referring now to FIG. 3, there is shown a logic block diagram of one embodiment of the multi-input scanners which functions to gate one of several data inputs 311 to the data output line 312 by means of the sixteen to one data selector 303. Unit 303 may be comprised of a series of AND and OR gates properly connected, or more commonly may be comprised of a typical MSI device such as SN74150 marketed by Texas Instruments and described in detail on pages 294–297 of Texas Instruments *TTL Data Book*, first edition. Data selector 303 selects one of the sixteen data inputs 311 based on the binary code of the inputs 313, 314, 315 and 316 which are stored in the 4-bit latch 302 upon receipt by the scanner command shift register 301 of a command message via command link 310. The command message is transmitted from comparator 130 to units 106 and 107, via the low speed command links 121 and 120, respectively. Scanner command shift register 301 and 4-bit latch 302 may be comprised of a series of flip-flops properly connected or more commonly may be comprised of typical MSI devices such as SN7475 and SN74164 marketed by Texas Instruments and described in detail on pages 182–186 and 334–338, respectively of Texas Instruments *TTL Data Book*, first edition.

Figure 4:
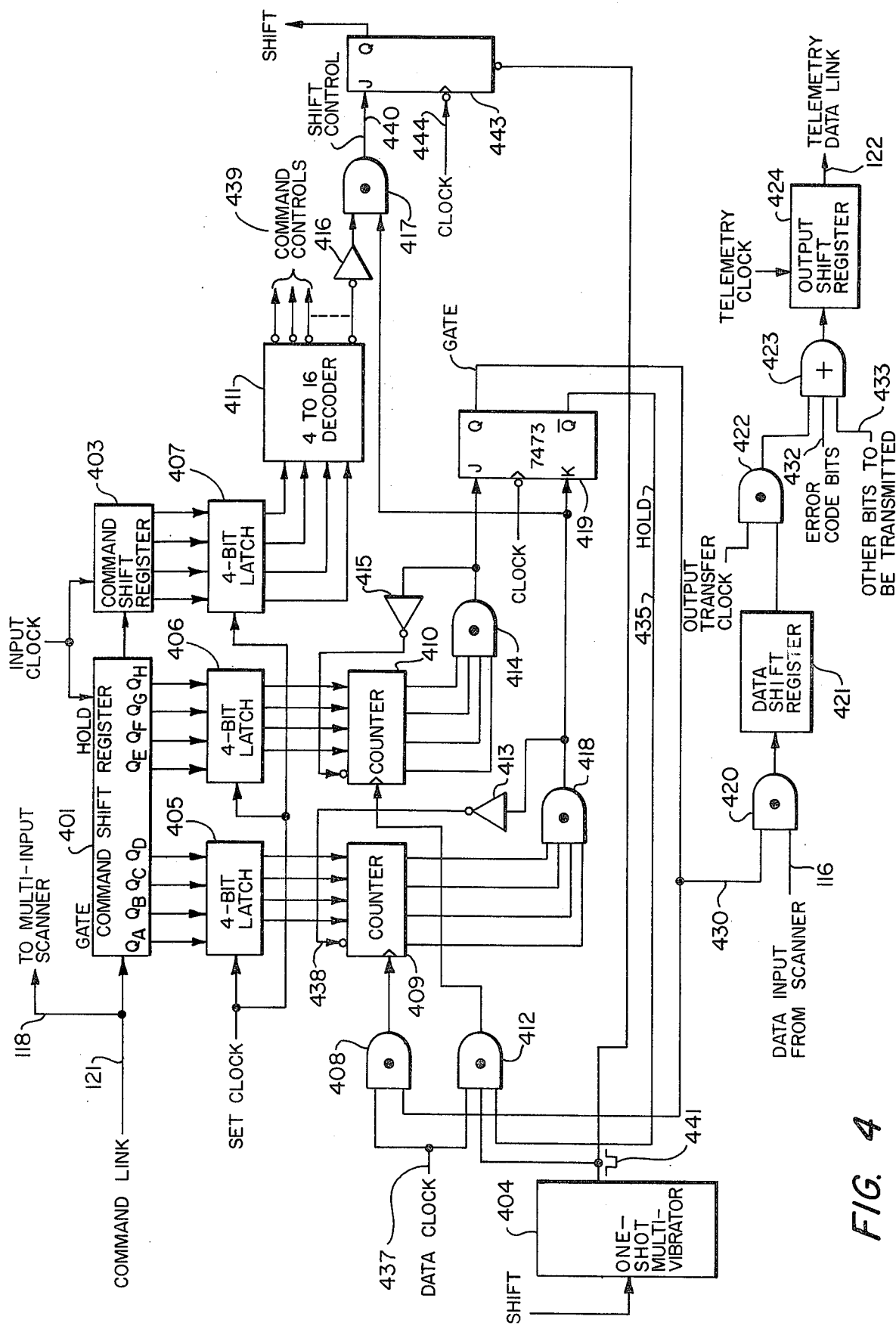
FIG. 4 is a detailed logic block diagram of the error-rate monitoring unit.

Referring now to FIG. 4, there is shown a logic block diagram of one embodiment of error-rate monitoring unit 106. Error-rate monitoring unit 107 is identical to unit 106 with the exception that unit 107 interfaces with lines 119, 117, 131 and 132 which corresponds to unit 106 interface lines 118, 116, 122 and 121, respectively. The primary function of the error-rate monitoring unit is to monitor data at points 112 and 103 via scanners 114 and 115. Data enters error-rate monitoring unit 106 via input line 116 and is sampled by AND gage 420 and stored in data shift register 421 when gate signal 430 is a logic one level. The monitored data is temporarily stored in shift register 421 prior to transfer to the output shift register 424 via AND gate 422 and OR gate 423. OR gate 423 also receives other bits to be transmitted 433 which typically may consists of control and/or status messages to comparator 130 common to the implementation of process/control systems. In addition, OR gate 423 receives error code bits 432 to be transmitted to comparator 130. The error code bits may typically consist of parity error check or more commonly a BCH code, effective in detection of errors introduced in retransmission of data from units 106 and 107. Comparator 130 receives the monitored data with the error-check code which enables the comparator to treat the monitored data, error-laden due to retransmission, differently than the monitored data which is received error-free. For example, monitored data, error-laden during retransmission, may be rejected by the comparator or may be weighted relative to error-free data in such a manner to maintain acceptable accuracy of the BER computation.

Returning now to AND gate 420, there is shown an input gate signal 430 which effectively gates data being monitored to comparator 130 in the above described manner. The gate signal 430 is generated by action of counter 410 which determines the length (number of data bits) of the gate signal and also by action of counter 409 which determines the length of time (also corresponds to number of data bits) between gate signal 430, which is referred to as the hold period (hold signal 435). Operating in conjunction with counters 409 and 410 are AND gates 414, 418, 408 and 412, inverters 413 and 415 and flip-flop 419. Counters 409 and 410 may be comprised of a series of flip-flops properly connected or more commonly may be comprised of typical MSI device such as SN74161 marketed by Texas Instruments and described in detail on pages 325–333 of Texas Instruments *TTL Data Book*, first edition. Counters 409 and 410 are incremented alternately by means of AND gates 408 and 412 which utilizes as one input a data clock signal 437 which, in turn, has been derived from the data input on line 116. The process of derivation of a data clock signal from a data signal is a common procedure in telecommunication equipment design. The 'gate' signal 430 and the 'hold' signal 435 are also signals applied as inputs to AND gates 408 and 412, respectively. Flip-flop 419 generates the gate and hold signals in an alternating manner by action of AND gate 414 and AND gate 418, respectively, which detect state 15 of counters 410 and 409. For example, counter 409 determines the length of the gate signal in the following manner: Flip-flop 419 Q output is a logic one, resulting in the data clock signal 437 being applied to counter 409 which has been preset to an initial count from 4-bit latch 405. Counter 409 will increment one state for each data clock pulse 437 until counter 409 reaches a state of 15, resulting in a logic one state for all inputs to AND gate 418. The output of AND gate 418 in turn becomes a logic one resulting in flip-flop 419 Q output (hold signal 435) changing from a logic one to a logic zero, which causes data clock signal 437 to alternate from counter 409 to counter 410 by action of AND gates 408 and 412. Simultaneously, signal 438 becomes a logic zero by action of inverter 413 causing counter 409 to change from a state of 15 to a preset state as determined by the contents of 4-bit latch 405. When flip-flop 419 changes state, the above described process is repeated with counter 410 being incremented until the output of AND gate 414 is a logic one causing flip-flop 419 to return to the initial state thus completing a cycle that is repeated until a new command is received via line 121 and stored in shift registers 401 and 403. The command may typically consist of a change to the gate and hold periods which are determined by the contents of the command message received and stored in positions $Q_A$–$Q_H$ of shift register 401. Positions $Q_A$–$Q_D$ contain the preset code (gate period) for the gate counter 409 and positions $Q_E$–$Q_H$ contain the preset code (hold period) for hold counter 410. Upon receipt of the entire command message, the contents of shift register 401 is transferred to 4-bit latches 405 and 406 which serve as storage registers to preset counters 409 and 410 as previously described. Shift registers 401 and 403 and 4-bit latches 405, 406 and 407 may be comprised of a series of flip-flops properly connected or more commonly may be comprised of typical MSI devices such as SN74164 and SN7475 marketed by Texas Instruments and described in detail on pages 334–338 and pages 182–186, respectively, of Texas Instruments *TTL Data Book*, first edition.

Shift register 403 stores the portion of the command messages which contain control message (shown as signal 439) many of which are common to telecommunications equipment. One command which is important to the monitoring process and more particularly to the synchronizing process, is shift control 440, which functions to increase the hold period by one data clock. The shift control command is initially transmitted by comparator 130 to either error-rate monitoring unit 106 or 107 upon determination by comparator 130 that units 106 and 107 are not synchronized; i.e., unit 106 during its gate period is not monitoring the same set of data as unit 107 during its gate period. Accordingly, comparator 130 issues a shift command to unit 106 (or to unit 107) which results in the next hold period to be one data clock greater in time than the hold periods for unit 107. As previously described, this process will be continued until the gate periods for both units 106 and 107 are monitoring the same sets of data (with necessary time delays incurred in transmission from point 112 to point 103). The above process begins with receipt by shift registers 401 and 403 of a shift control coded message via command link 121. The entire message may also contain gate and hold period commands which are temporarily stored in shift register 401. The shift control portion of the command message is temporarily stored in shift register 403 and is transferred to 4-bit latch 407 which provides inputs to the 4 to 16 decoder 411. The 4 to 16 decoder 411 may be comprised of a series of gates properly connected or more commonly may be comprised of typical MSI device such as SN74154 marketed by Texas Instruments and described in detail on pages 308–311 of Texas Instruments *TTL Data Book*, first edition. Decoder 411 decodes the shift control command causing the input to inverter 416 to be a logic zero which, in turn, presents a logic one to the input of AND gate 417. Coincident with a logic one from AND gate 418, the output of AND gate 417 (shift control signal 440) becomes a logic one setting flip-flop 443 and triggering one-shot multivibrator 404 with a logic zero pulse 441. Pulse 441 is equal in length to one data clock which effectively inhibits one data clock 437 from passing through AND gate 412. This, in turn, results in the hold period being extended by a length of time equal to one data clock. One-shot multivibrator 404 is also utilized to provide a reset pulse to flip-flop 443 as shown in FIG. 4. Clock signal 444, which is utilized to set flip-flop 443, is similar in function to other clock signals shown in FIGS. 3 and 4 and is typical of control/timing signals commonly utilized in the design and implementation of process-control equipment.

What is claimed is:

1. An apparatus for in-service monitoring of the accuracy of electronic data transmitted over a first communication channel or telemetry link comprising:
   a. first means, in a first system, for monitoring for accuracy a first unit of said data transmitted over said first communication channel;
   b. second means, in a second system, for monitoring for accuracy a second unit of said data received over said communication channel;
   c. third means, in said second system coupled to said second means, for transmitting substantially all of said second monitored unit of said data, which is a full version of the information in said second monitored unit of data, to said first system over a second communication channel;
   d. fourth means, in said first system coupled to said first means, for comparing substantially all of said first unit of monitored data, which is a full version of the information in said first unit of monitored data, with substantially all of said second unit of monitored data; and
   e. fifth means, coupled to said fourth means, for calculating a bit error rate (BER) of said data transmitted from said first system to said second system.

2. An apparatus as recited in claim 1 including sixth means coupled to said fifth means for comparing said BER to a predetermined value.

3. An apparatus as recited in claim 2 including seventh means, coupled to said fourth means, for time-delaying said first unit of monitored data relative to said second unit of monitored data prior to comparing said first unit of monitored data with said second unit of monitored data.

4. An apparatus as recited in claim 3 including eighth means, coupled to said seventh means, for repeating said time-delay and comparison of said first unit of monitored data until said BER is less than said predetermined value.

5. An apparatus as recited in claim 4 including ninth means, coupled to said eighth means, for terminating said time-delay and comparison of said first unit of monitored data after a predetermined number of times, if said BER remains greater than said predetermined value.

6. An apparatus as recited in claim 5 including tenth means, coupled to said ninth means, for introducing a new data list in said unit of data received, and further including eleventh means for comparing said first unit of monitored data in said unit of data transmitted with said second unit of monitored data in said unit of data received.

7. A method for in-service monitoring the accuracy of electronic data transmitted over a communication channel or telemetry link comprising the steps of:
   a. monitoring in a first site first units of data, one each for each set of data (i.e. block) being transmitted;
   b. monitoring in a second site second units of data, one each for each set of data (i.e. block) being received;
   c. transmitting said second unit of monitored data in said second site to said first site;
   d. comparing said second unit of monitored data with said first unit of monitored data; and
   e. determining if the comparison is synchronized to the same unit of data so that the first unit of monitored data in said first site is compared for the same set of data to the second unit of monitored data transmitted from said second site to said first site.

8. The method as recited in claim 7 including the further step of obtaining data synchronization if there is block synchronization by time delaying said second units of monitored data with respect to said first units of monitored data.

9. The method as recited in claim 8 including the further step of obtaining block synchronization if there is no data synchronization by introducing a new data bit within said block.

10. An apparatus for monitoring the accuracy of electronic data transmitted over a communication channel or telemetry link comprising:
    a. first means for monitoring first units of data (i.e. first blocks) transmitted from a transmitting station;
    b. second means for monitoring second units of data (i.e. second blocks) received at a receiving station;
    c. third means, coupled to said second means, for transmitting said second blocks of monitored data from said receiving station to said transmitting station said second blocks of data being substantially a full version of the information in said second blocks of data received;
    d. fourth means, coupled to said first and third means, for determining whether or not there is data and block synchronization; and
    e. fifth means, coupled to said fourth means, for calculating bit error rate, BER of data received at said receiving station.

11. An apparatus for monitoring the accuracy of electronic data transmitted over a communication channel or telemetry link comprising:
    a. first means for monitoring first units of data (i.e. first blocks) transmitted from a transmitting station;
    b. second means for monitoring second units of data (i.e. second blocks) received at a receiving station;
    c. third means, coupled to said first means, for transmitting said first units of monitored data from said transmitting station to said receiving station said first units of monitored data being substantially a full version of the information in said first units of data transmitted;
    d. fourth means, coupled to said first and third means, for determining whether or not there is data and block synchronization; and e. fifth means, coupled to said fourth means, for calculating bit error rate BER of data received at said receiving station.

12. An apparatus for in-service monitoring of the accuracy of electronic data transmitted over a selected one of a plurality of communication channels or telemetry links comprising:
   a. first means, in a first system, for selecting a first of a plurality of telemetry links or communication channels to be monitored for accuracy of data transmission;
   b. second means, in said first system, coupled to said first means, for monitoring for accuracy a first unit of said data transmitted over said selected communication channel;
   c. third means, in a second system responsive to said first system, for monitoring for accuracy a second unit of said data that is received over said selected communication channel;
   d. fourth means, in said second system coupled to said third means, for selecting a second of a plurality of telemetry links or communication channels for retransmitting said second unit of monitored data to said first system;
   e. fifth means, in said first system coupled to said second and third means, for comparing said first unit of monitored data with said second unit of monitored data; and
   f. sixth means, coupled to said fifth means, for calculating a bit error rate (BER) of said data transmitted from said first system to said second system.

13. An apparatus as recited in claim 12 including seventh means, coupled to said fifth means, for time-delaying said first unit of monitored data relative to said second unit of monitored data prior to comparing said first unit of monitored data with said second unit of monitored data.

14. An apparatus as recited in claim 13 including eighth means, coupled to said sixth means, for comparing said BER to a predetermined value.

15. An apparatus as recited in claim 14 including ninth means, coupled to said seventh and eighth means for repeating said time-delay and comparison of said first unit of monitored data until said BER is less than a predetermined value.

* * * * *